United States Patent [19]
Sanami et al.

[11] Patent Number: 6,070,740
[45] Date of Patent: Jun. 6, 2000

[54] PROTECTOR FOR HOLDING FILTER MEDIUM

[75] Inventors: Yoshihisa Sanami, Obu; Toshihiro Takahara, Kariya; Shuji Yamaguchi, Toyokawa, all of Japan

[73] Assignee: Denso Corporation, Japan

[21] Appl. No.: 09/017,200

[22] Filed: Feb. 2, 1998

[30] Foreign Application Priority Data

Feb. 3, 1997 [JP] Japan .................................. 9-020621
Feb. 3, 1997 [JP] Japan .................................. 9-020711

[51] Int. Cl.[7] .................................................. B01D 29/19
[52] U.S. Cl. ...................... 210/457; 210/493.1; 428/35.7
[58] Field of Search ............................. 20/437, 440, 457,
20/458, 486, 487, 453, 455, 490, 493.1,
497.01; 162/103, 218, 219, 228, 267; 55/514,
515; 428/35.7

[56] References Cited

U.S. PATENT DOCUMENTS

| | | |
|---|---|---|
| 4,038,194 | 7/1977 | Luceyk et al. . |
| 5,306,424 | 4/1994 | Matsushita . |
| 5,759,351 | 6/1998 | Takahara et al. ..................... 210/493.1 |
| 5,772,881 | 6/1998 | Stockhowe et al. ..................... 210/457 |

FOREIGN PATENT DOCUMENTS

| | | |
|---|---|---|
| 0323786 A2 | 7/1989 | European Pat. Off. . |
| 1926357 | 11/1970 | Germany . |
| 3514778 C1 | 8/1986 | Germany . |
| 4416577 A1 | 11/1994 | Germany . |
| U-4-118105 | 10/1992 | Japan . |
| 212233 | 4/1924 | United Kingdom ................... 210/490 |
| 1273251 | 5/1972 | United Kingdom . |

*Primary Examiner*—Matthew O. Savage
*Attorney, Agent, or Firm*—Nixon & Vanderhye PC

[57] ABSTRACT

A protector for holding a filter medium thereon is made of resin and composed of a plurality of pillar members. The pillar members are disposed in parallel with each other in a longitudinal direction thereof and forming a circular shape with intervals respectively between adjacent two pillar members. Accordingly, the protector can be easily manufactured by molding and can be easily scrapped after its use. The protector further has a positioning member for positioning the protector in a case. Accordingly, a number of parts in a filter device can be reduced, resulting in a decrease in man-hours for assembling the parts.

10 Claims, 4 Drawing Sheets

PROTECTOR FOR HOLDING FILTER MEDIUM

CROSS REFERENCE TO RELATED APPLICATIONS

This application is based upon and claims the benefit of priority of the prior Japanese Patent Applications No. 9-20621 filed on Feb. 3, 1997, and No. 9-20711 filed on Feb. 3, 1997, the contents of which are incorporated herein by reference.

BACKGROUND OF THE INVENTION

1. Field of the Invention:

The present invention relates to a protector for holding a filter medium thereon, which is used for a filter.

2. Related Arts:

JP-U-4-118105 discloses an oil filter including a filter member composed of a filter medium member and a protector for holding the filter medium member thereon to reinforce the strength of the filter member and to keep a specific shape of the filter medium member. Specifically, the protector is made of a punched metal plate having plural holes and has a cylindrical shape. The protector is disposed on an inner circumference of the filter medium member, thereby forming the filter member. The filter member is located in a specific position within a case by a plate spring.

In the above-mentioned oil filter, however, the protector cannot be easily scrapped when the filter member is exchanged and the handling of the protector is difficult. This is because the protector is made of metal so that the protector is not burned together with the filter medium member. In addition, in the above-mentioned oil filter, the protector for keeping the shape of the filter medium member and the part (the plate spring) for positioning the filter member are respectively provided, resulting in an increase in number of parts. The increase in number of the parts causes increase in man-hours for assembling the parts.

SUMMARY OF THE INVENTION

The present invention has been made in view of the above-mentioned problems and a first object of the present invention is to provide a protector for holding a filter medium, which is easily handled. A second object of the present invention is to provide a protector having a positioning member for being positioned in a case.

To achieve the first object of the present invention, a protector is made of resin and has a plurality of pillar members disposed in parallel with each other in a longitudinal direction of the pillar members and forming a circular shape with intervals respectively between adjacent two pillar members. Accordingly, the protector is easily handled to be scrapped after its use. Further, the protector is easily manufactured by molding. Preferably, the protector has a circular connecting member connecting the pillar members in a circumferential direction of the circular shape. The protector can have several circular connecting members disposed at different positions in a radial direction of the circular shape of the pillar members. Accordingly, the strength of the protector is enhanced. Further, even with several circular connecting members are provided, the protector is easily molded. The thus constructed protector can be used as a suction base when a filter medium is disposed on the protector. Specifically, after immersing the protector into slurry, the filter medium can be disposed on the protector by sucking the slurry from an outside of the protector to an inside of the protector.

To achieve the second object of the present invention, a protector includes a protector body for holding a filter medium and a positioning member integrally connected to the protector body for positioning the protector in a case by abutting the case. Accordingly, the protector is positioned in the case without using another part, resulting in the decrease in number of parts. Preferably, the positioning member is elastically deformed with respect to the protector body. The protector body may be composed of a plurality of pillar members disposed in parallel with each other to have a cylindrical shape with intervals respectively between adjacent two pillar members. In this case, the positioning member can be disposed on an end of the cylindrical shape of the pillar members. The positioning member may be embedded in the filter medium disposed on the protector body while exposing a surface for abutting the case.

BRIEF DESCRIPTION OF THE DRAWINGS

These and other objects and features of the present invention will become more readily apparent from a better understanding of a preferred embodiment described below with reference to the following drawings.

DETAILED DESCRIPTION OF THE PREFERRED EMBODIMENT

Figure 1:
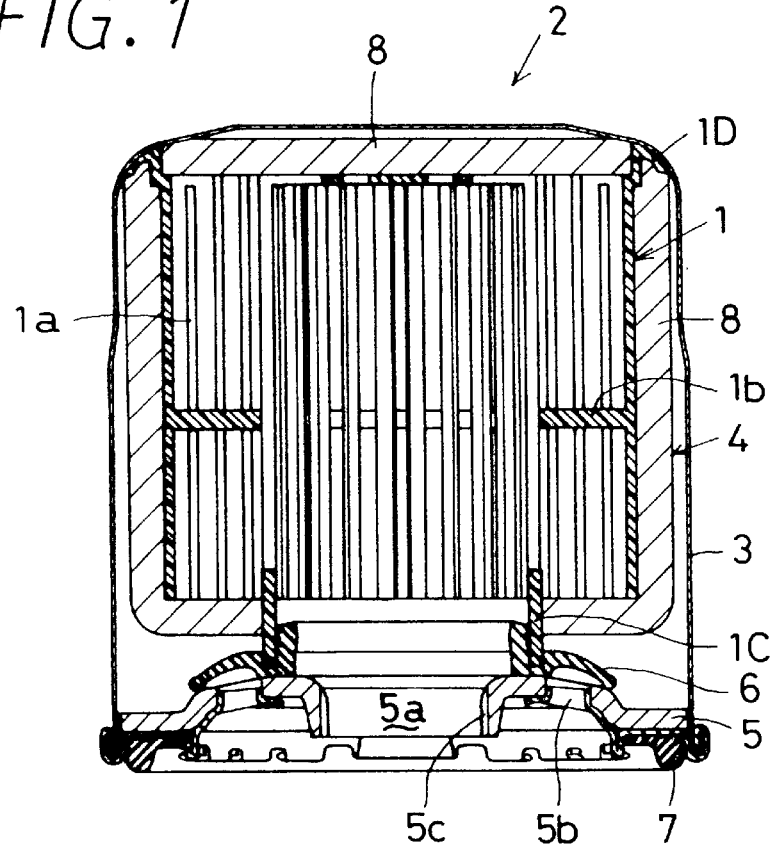
FIG. 1 is a cross-sectional view showing a filter device in a preferred embodiment of the present invention.

A protector 1 in a preferred embodiment of the present invention is used for a filter device 2 for filtering an engine oil as shown in FIG. 1. The filter device 2 has a case 3, a filter member 4, a plate 5, a movable valve member 6 made of rubber, a gasket 7, and the like. The movable valve member 6 serves as a check valve and a relief valve. The case 3 is made of, for example, iron and has a cylindrical shape having a bottom wall at an end thereof and an opening portion at the other end thereof. The filter member 4 includes the protector 1 and a filter medium member 8 held on the protector. The protector 1 will be described later in more detail.

The plate 5 holds the filter member 4 together with the case 3. The plate 5 has an oil outlet 5a at a central portion thereof and several oil inlets 5b at a peripheral portion of the oil outlet 5a. The oil flowing from an engine (the oil before filtered) flows into the oil inlets 5b, and the oil filtered by the filter member 4 (filter medium member 8) is discharged from the oil outlet 5a. The inner circumferential surface of the oil outlet 5a serves as a female screw 5c that is to be engaged with a male screw provided on a mounting base (not shown) on an engine side.

The movable valve member 6 is disposed between the plate 5 and the filter member 4 and opens and closes the oil inlets 5b of the plate 5. More specifically, the movable valve member 6 opens the oil inlets 5b only when the oil flowing from the engine flows into the oil inlets 5b. The gasket 7 is made of, for example, rubber, and disposed on the opening portion of the case 3 for hermetically sealing the case 3 with respect to the mounting base on the engine side.

Figure 2:
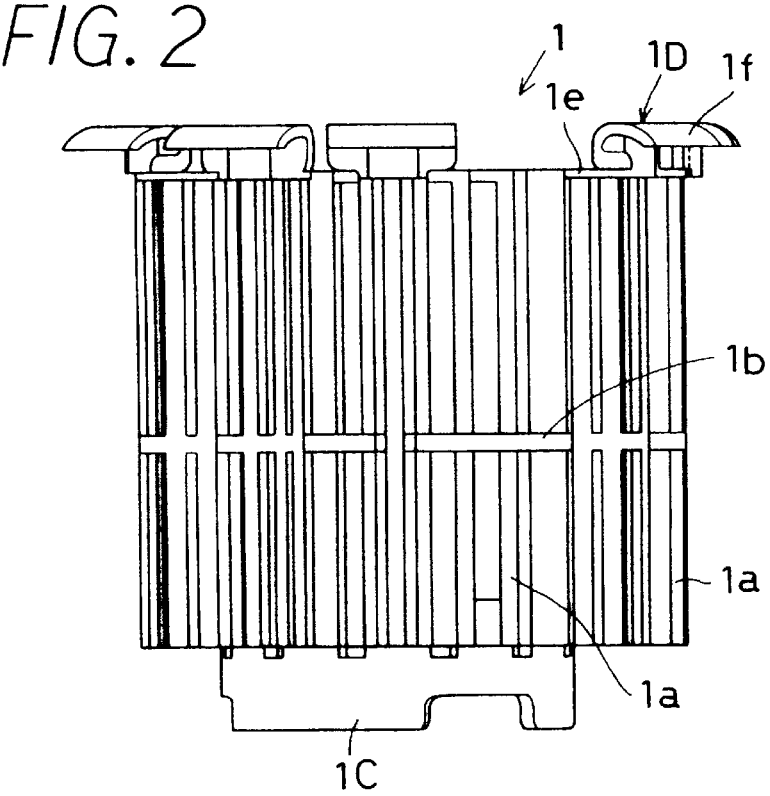
FIG. 2 is a side view showing a protector of the filter device in the embodiment.
Figure 3:
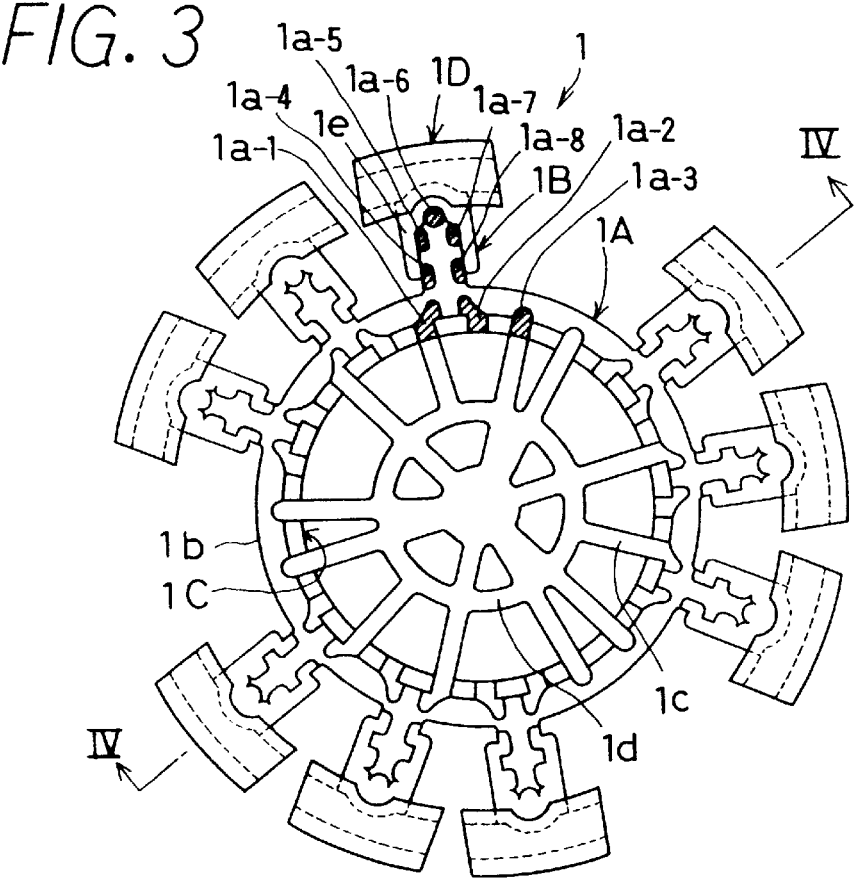
FIG. 3 is a top end view showing the protector.

Then, the filter member 4 composed of the protector 1 and the filter medium member 8 will be explained. The protector 1 is molded from resin, and has heat resistance and oil resistance. As shown in FIGS. 2 and 3, the protector 1 has a plurality of pillar members 1a arranged with a comb-like shape in a side view and with a stellate shape in a cross-sectional view. The pillar members 1a form a protector body in this embodiment. The arrangement of the comb-like shape means that the pillar members 1a are arranged substantially in parallel with each other (in a vertical direction in FIG. 2) with intervals respectively between adjacent two pillar members. The arrangement of the stellate shape is as follows.

As shown in FIG. 3, some of the pillar members 1a are arranged with a circular shape, thereby forming a cylindrical portion 1A as a central portion of the stellate shape. The other of the pillar members 1a are arranged with several U-shapes to form several (nine in this embodiment) protruding portions 1B of the stellate shape, which protrude outside from an outer circumference in a radial direction of the cylindrical portion 1A.

The pillar members 1a forming the cylindrical portion 1A are connected to a cylinder member 1C shown in FIG. 2 on a plate side. The pillar members 1a forming the cylindrical portion 1A are further connected to a circular connecting member 1b (see FIG. 2) at a generally central portion in a longitudinal direction thereof. Accordingly, the pillar members 1a are fixed in a circumferential direction thereof by the circular connecting member 1b. The connecting member 1b has protruding portions for connecting the pillar members 1a forming the protruding portions 1B as well (see FIGS. 3 and 4). Further, as shown in FIG. 3, several ribs 1c elongating in a radial direction of the cylindrical portion 1A and a circular rib id connecting the ribs 1c are provided on an upper end face of the cylindrical portion 1A.

The cylindrical portion 1A and the protruding portions 1B are now explained in more detail. In FIG. 3, a part of the pillar members 1a-1 to 1a-8 are hatched for the explanation. The cylindrical part 1A includes three types of pillar members 1a-1 to 1a-3 having generally plate-like shapes and radially arranged to form a part of the circular shape in cross-section of the cylindrical part 1A. The pillar members 1a-1 and 1a-3 are connected to the ribs 1c on upper ends thereof, while the pillar member 1a-2 is independent on an upper end thereof. All of the pillar members 1a-1 to 1a-3 are, as mentioned above, connected to the cylinder member 1C at lower ends thereof.

Each of the protruding portions 1B has five pillar members 1a-4 to 1a-8, and the pillar members 1a-4 to 1a-8 are connected to a plate-like member 1e at upper ends thereof, and are independent at lower end thereof. As mentioned above, all of the pillar members 1a-1 to 1a-8 are connected to the connecting member 1b at the center portion in a longitudinal direction thereof, and elongate in upper and lower directions with respect to the connecting members 1b.

Figure 4:
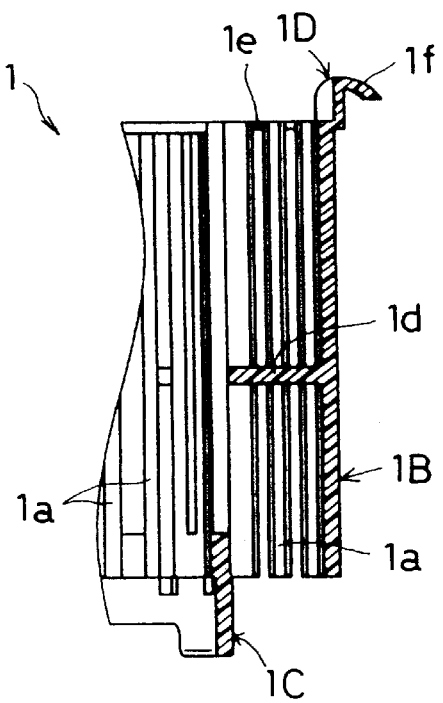
FIG. 4 is a cross-sectional view taken along a IV—IV line in FIG. 3, partially showing the protector.

Further, each of the protruding portions 1B has a positioning member 1D for positioning the protector 1 on a specific location within the case 3. As shown in FIG. 4, the positioning member 1D elongates in an upper direction from an outer circumference on an upper end of the protruding portion 1B and then bends to protrude outside in the radial direction of the cylindrical portion 1A. The thus formed positioning member 1D is disposed on the protruding portion 1B such that it can be elastically deformed with respect to the protruding portion 1B. The outer surface 1f of the bent portion of the positioning member 1D abuts an inside surface of the case 3 so that the protector 1 is positioned at a specific portion in the case 3 (see FIG. 1).

The cylinder member 1C is, as shown in FIG. 1, engaged with the movable valve member 6 with air-tightness. Accordingly, the cylinder member 1C serves as a valve seat that moves together with the movable valve member 6 and divides the filter medium member 8 into an upstream side (before filtering) and a downstream side (after filtering).

The cylinder member 1C serving as a second circular connecting member is disposed on an inner side in the radial direction of the cylindrical portion A compared with the connecting member 1b serving as a first circular connecting member. Therefore, the two circular connecting members can be molded by a die capable of being separated in an axial direction thereof. Further, the cylindrical portion 1A has the ribs 1c radially elongating on the upper end face thereof and disposed on an inner side with respect to the cylinder member 1C to connect several pillar members 1a. Therefore, the shape of the protector 1 is retained with sufficient strength. The plate-like members 1e are disposed on an upper ends of the protruding portions 1B to respectively surround the protruding portions of the connecting member 1b in a projected state, thereby retaining the shapes of the protruding portions 1B.

Figure 5:
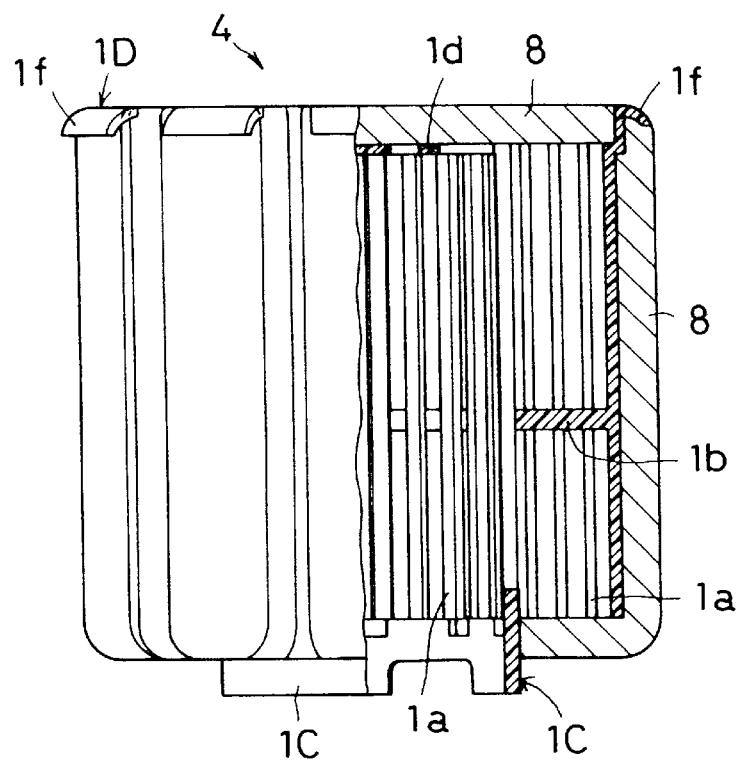
FIG. 5 is a fragmentary cross-sectional view showing a filter member composed of the protector and a filter medium member in the embodiment.
Figure 6:
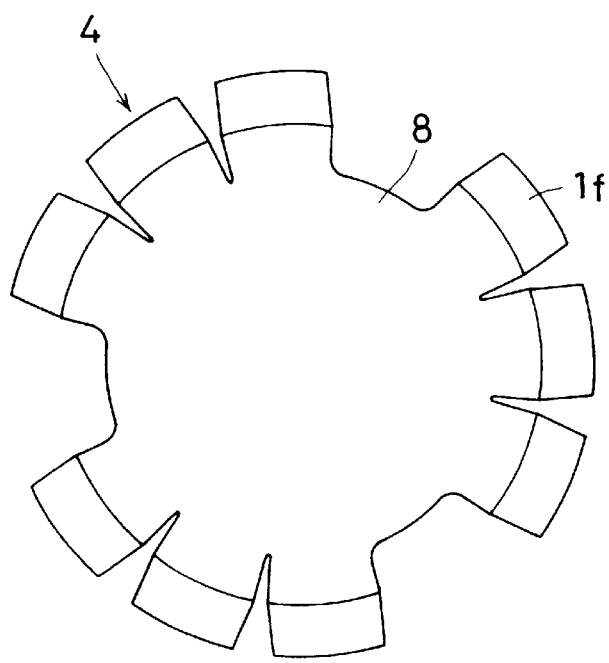
FIG. 6 is a top end view showing the filter member.

The filter medium member 8 is, as shown in FIGS. 5 and 6, disposed on the side, upper, and lower surfaces of the protector 1. That is, the filter medium member 8 is disposed on the outer surfaces of the assembled member (protector) composed of a plurality of the pillar members 1a. Accordingly, the protector 1 provides a passage space for the oil inside of the filter medium member 8 while retaining the shape of the filter medium member 8.

Figure 7:
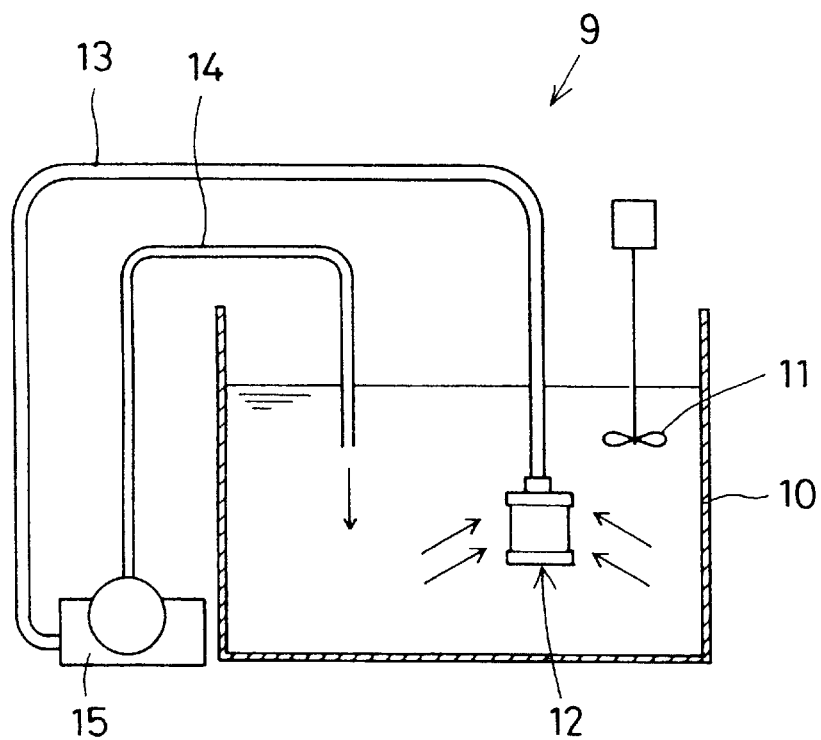
FIG. 7 is a schematic view showing a suction apparatus for forming the filter medium member on the protector.
Figure 8:
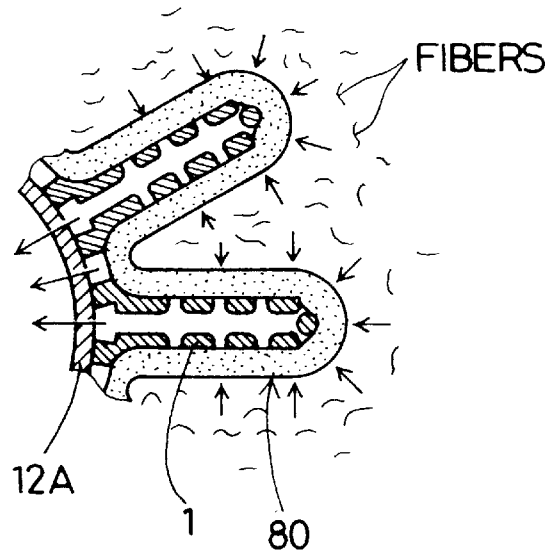
FIG. 8 is a fragmentary cross-sectional view for explaining a process for forming the filter medium member on the protector.

The filter medium member 8 is disposed on the protector 1 in the following way by using a suction apparatus 9 shown in FIG. 7. Specifically, the suction apparatus 9 has a water tank 10 filled with slurry including fibers, an agitator 11 for agitating the slurry within the water tank 10, a suction jig 12 immersed in the slurry within the water tank 10, a suction pump 15, a suction pipe 13 connecting the suction jig 12 and the suction pump 15, a discharge pipe 14, and the like. The suction pump 15 sucks the slurry from the water tank 10 through the suction jig 12 and the suction pipe 13 and brings the slurry back into the water tank 10 through the discharge pipe 14. The fibers for the filter medium member 8 is preferably made of polyester useful for obtaining high oil resistivity, acrylic useful for obtaining high filtering property, pulp capable of reducing cost, or the like. As shown in FIG. 8, the suction jig 12 has a suction core 12A having a cylindrical shape, and the protector 1 is attached to the outer circumference of the suction core 12A. That is, the protector 1 is used as a part of the suction jig 12 as a suction base.

Next, processes for forming the filter medium member 8 will be explained. Firstly, fibers that are finely cut by a mixer (not shown) or the like in advance are mixed with binder fibers (thermally fusing fibers), put into the water tank 10, and then agitated by the agitator 11 such that a concentration of the fibers in the slurry within the water tank 10 becomes uniform. Subsequently, the suction jig 12 is immersed into the slurry. Then, the suction pump 15 is operated.

Accordingly, the slurry within the water tank 10 circulates in a route of the water tank 10→the suction jig 12→the suction pipe 13→the suction pump 15→the discharge pipe 14→the water tank 10.

As a result of this suction process, a part of the fibers contained within the slurry are attached on the surface of the protector 1, and successively other fibers are deposited on the fibers attached on the protector 1 to form a layer (see FIG. 8). Consequently, a filter medium body 80 for the filter medium member 8 covering the protector 1 is obtained (see FIGS. 5 and 6). After forming the filter medium body 80, the filter medium body 80 is detached from the suction jig 12 together with the protector 1 and taken out from the water tank 10. Then, the filter medium body 80 and the protector 1 are dehydrated and heated at a specific temperature such that the filter medium body 80 is dried and hardened. Subsequently, after binder resin is impregnated into the filter medium body 80, the filter medium body 80 is heated again at a specific temperature along with the protector 1 such that the binder resin is hardened. As a result, the filter member 4 composed of the protector 1 and the filter medium member 8 is obtained. The binder resin is thermosetting resin such as phenol resin or the like.

In the thus formed filter member 4, as shown in FIG. 5, the positioning members 1D are embedded in the filter medium member 8 while exposing the outer surfaces if of the bent portions thereof. Therefore, when the filter member 4 is positioned in the case, the outer surfaces If of the positioning members 1D abut the inside surface of the case 3 to position the filter member 4 within the case 3. Accordingly, positioning accuracy of the filter member 4 is improved. In this embodiment, the several positioning members 1D are symmetrically disposed in the protector 1, so that the positioning accuracy of the protector 1 (filter member 4) is further improved.

Further, in this case, no stress is applied to the filter medium member 8 within the case 3. That is, the filter medium member 8 is held only by the protector 1 within the case 3, and there is no need that the filter medium member 8 is pushed against the inside surface of the case 3. Furthermore, there is no need to use an extra part for positioning the protector 1 within the case 3, resulting in decrease in number of the parts and decrease in man-hour for assembling the parts. In this embodiment, the positioning members 1D are formed to be elastically deformed with respect to the protruding portions 1B. Therefore, deviation in positioning of the protector 1 in the case 3 can be absorbed by elastic deformation of the positioning members 1D. However, it is not always necessary that the positioning members 1D are elastically deformed.

According to this embodiment, the protector 1 is made of resin. Therefore, the filter member 4 can be easily scrapped (burned) after its use, so that the handling of the filter member 4 becomes easy compared to a conventional filter member including a protector made of metal. The protector 1 is composed of a plurality of the pillar members 1a arranged with the comb-like shape. Therefore, when the protector 1 is molded by a die, the protector 1 is easily taken out from the die in the axial direction thereof. That is, the protector 1 has good moldability. In addition, when forming the filter medium member 8 on the protector 1, the protector 1 is used as the suction base. Therefore, although the filter medium body 80 is in a sorbet-like state or a cotton-like state just after deposited, the filter medium body 80 can be easily detached from the suction jig 12 together with the protector 1 by holding the protector 1.

Further, the protector 1 has the connecting member 1b connecting the pillar members 1a of the cylindrical portion 1A and the pillar members 1a of the protruding portions 1B. The protector 1 further has the ribs 1c and the cylinder member 1C connecting the pillar members 1a of the cylindrical portion 1A on the upper and lower ends of the cylindrical portion 1A. Accordingly, the pillar members 1a are reinforced, so that the strength (stiffness) of the protector 1 is improved. As a result, the strength of the filter member 4 is improved.

Further, the cylinder member 1C of the protector 1 is engaged with the movable valve member 6 and serves as the valve seat. Simultaneously, the cylinder member 1C sandwiches the movable valve member 6 in cooperation with the plate 5, so that the upstream side and the downstream side of the filter medium member 8 is hermetically divided by the movable valve member 6. In this case, the movable valve member 6 serves as a sealing member.

In this embodiment, when forming the protector 1 by molding, the protector 1 composed of a plurality of the pillar members 1a is taken out from the die in the axial direction thereof, however, it is not necessary for the protector 1 to be taken out from the die in the axial direction. The protector 1 may have a shape capable of being taken out from a die in a radial direction or the like.

In this embodiment, the connecting member 1b is adopted to the protector 1 for connecting the pillar members 1a at the generally central portion in the longitudinal direction of the pillar members 1a. Alternatively, several connecting members for connecting the pillar members may be disposed at several portions in the longitudinal direction of the pillar members 1a. In this case, the strength of the protector 1 is more improved. Further, by disposing the several connecting members in different positions in the radial direction of the cylindrical portion 1A, the protector 1 can be easily molded In this embodiment, although the filter medium member 8 is formed form the filter medium body 80 deposited on the protector by the suction process, a filter paper folded into a chrysanthemum-like shape or the like may be used as the filter medium member 8.

In this embodiment, the pillar members 1a of the protector 1 are arranged with the satellite shape having the cylindrical portion 1A and the protruding portions 1B, and the positioning members 1D are respectively disposed on the protruding portions 1B. However, it is not always necessary that the protector 1 has the protruding portions 1B. When the protector 1 only has the cylindrical portion 1A, the positioning members 1D may be disposed on the upper end face of the cylindrical portion 1A, and may be connected to the upper end face of the cylindrical portion 1A directly or through some members.

While the present invention has been shown and described with reference to the foregoing preferred embodiment, it will be apparent to those skilled in the art that changes in form and detail may be made therein without departing from the scope of the invention as defined in the appended claims.

What is claimed is:

1. A protector for holding a filter medium for separating particulate matter from fluid, the protector being made of resin and comprising a plurality of first pillar members disposed in parallel with each other in a longitudinal direction of the first pillar members and forming a circular shape with intervals respectively between adjacent two first pillar members, and a plurality of second pillar members disposed in parallel with the plurality of first pillar members and collectively forming a protruding portion protruding from an outer circumference of the circular shape of the plurality of first pillar members in a radial direction of the circular shape thereby defining a protuberance in said first radial direction, wherein there are a plurality of said protruding portions, each protruding in a respective radial direction from the outer circumference of the circular shape of the plurality of first pillar members, each said protruding portion of said plurality of said protruding portions being defined by a respective plurality of said second pillar members.

2. The protector according to claim 1, further comprising a first circular connecting member connecting the first pillar members in a circumferential direction of the circular shape of the first pillar members.

3. The protector according to claim 2, further comprising a second circular connecting member connecting the first pillar members in the circumferential direction of the circular shape of the first pillar members and disposed at a position different from that of the first circular connecting member in the longitudinal direction of the first pillar members and in the radial direction of the circular shape of the first pillar members.

4. The protector according to claim 3, wherein the second circular connecting member has a cylindrical shape, and connects the first pillar members at end portions in the longitudinal direction of the first pillar members.

5. The protector according to claim 1, further comprising a positioning member for positioning the protector within a case by abutting the case when the protector is held in the case, the positioning member made of resin and integrally connected to first the pillar members.

6. The protector according to claim 1, further comprising a positioning member for positioning the protector in a case by abutting the case when the protector is held in the case, wherein:

the first pillar members are arranged to substantially form a cylindrical shape with intervals between adjacent two first pillar members; and the positioning member is disposed on an end in an axial direction of the cylindrical shape of the first pillar members and integrally connected to the first pillar members to protrude from a side surface of the cylindrical shape of the first pillar members.

7. The protector according to claim 6, wherein the positioning member is connected to a said plurality of second pillar members defining a said protruding portion.

8. The protector according to claim 1, wherein the plurality of first pillar members and the plurality of second pillar members are integral with one another.

9. A protector for holding a filter medium for separating particulate matter from fluid, comprising:

a plurality of first pillar members disposed in parallel with each other in a longitudinal direction thereof and collectively forming an assembly of circular shape with gaps defined respectively between adjacent first pillar members; and at least one protruding structure protruding in a respective radial direction from an outer circumference of the assembly of circular shape formed by said plurality of first pillar members, each said protruding structure being defined by a plurality of second pillar members, said second pillar members being disposed in parallel with the plurality of first pillar members, said first pillar members and said second pillar members being made of resin, wherein there are a plurality of said protruding structures, each protruding radially from respective circumferentially spaced locations about said outer circumference of said assembly of circular shape.

10. The protector according to claim 9, further comprising a first circular connecting member circumferentially connecting the first pillar members, a second circular connecting member circumferentially connecting the first pillar members and disposed at a position different from that of the first circular member in the longitudinal direction of the first pillar members and in the radial direction of the circular shape of the assembly of first pillar members, one of said first and second circular connecting members having protruding portions for connecting the second pillar members forming said at least one protruding structure to the first pillar members.

* * * * *